United States Patent [19]

East

[11] Patent Number: 4,936,443

[45] Date of Patent: Jun. 26, 1990

[54] APPARATUS AND A METHOD FOR CONNECTING BELT CONVEYOR STRINGERS TO SUPPORT STANDS

[75] Inventor: Charles F. East, Van Vleet, Miss.

[73] Assignee: FMC Corporation, Chicago, Ill.

[21] Appl. No.: 353,995

[22] Filed: May 19, 1989

[51] Int. Cl.⁵ .............................................. B65G 41/00
[52] U.S. Cl. ...................................... 198/827; 403/348
[58] Field of Search ............ 198/827, 828, 830, 861.2; 403/348, 349, 317, 263; 248/225.1, 222.1

[56] References Cited

U.S. PATENT DOCUMENTS

| | | | |
|---|---|---|---|
| 2,373,839 | 4/1945 | Madeira | 198/861.2 |
| 2,551,513 | 5/1951 | Thomson | 198/861.2 X |
| 2,605,887 | 8/1952 | Duncan | 198/861.2 X |
| 2,862,607 | 12/1958 | Stamos et al. | 198/827 |
| 3,200,940 | 8/1965 | Higgins | 198/827 |
| 3,820,650 | 6/1974 | Garvey | 198/830 X |
| 4,475,648 | 10/1984 | Weeks | 198/830 |
| 4,736,835 | 4/1988 | Hinkle | 198/861.2 X |

Primary Examiner—Robert J. Spar
Assistant Examiner—D. Glenn Dayoan
Attorney, Agent, or Firm—Raymond E. Parks; Douglas W. Rudy; Richard B. Megley

[57] ABSTRACT

An apparatus and method for connecting the opposite ends of a belt conveyor stringer to longitudinally spaced ground engaging support stands without the use of tools. The stringer is made from a length of round pipe, the ends of which have diametrically outwardly projecting locking lugs for locking the stringer ends in slotted brackets fixed to the top of the support stands. The outer wall of the bracket has a gravity actuated lug keeper plate, or a spring loaded lug keeper plate, which locks the lug in the bottom of the slots in the bracket when the stringer is rotated in one direction.

9 Claims, 1 Drawing Sheet

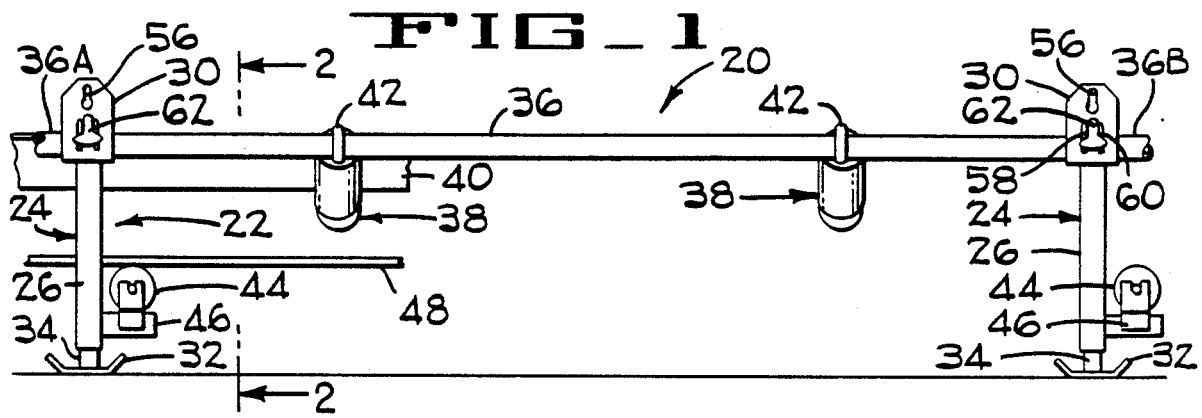
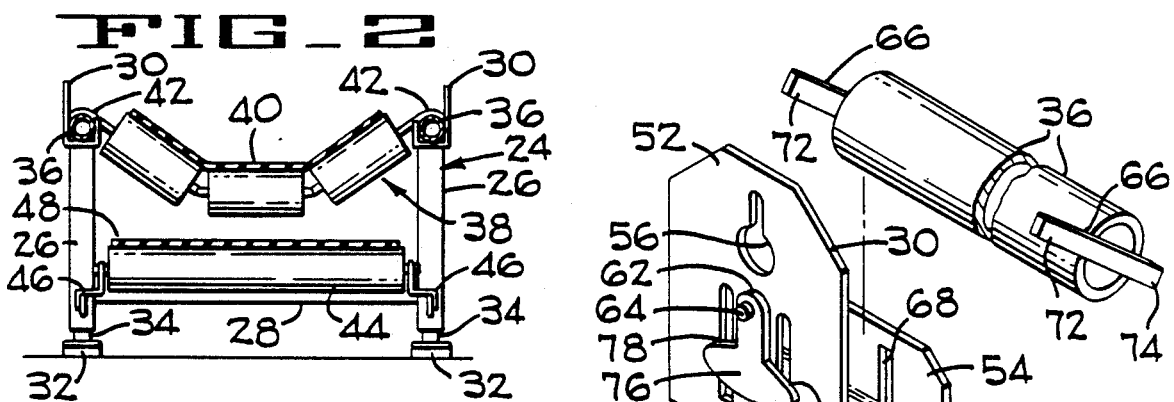
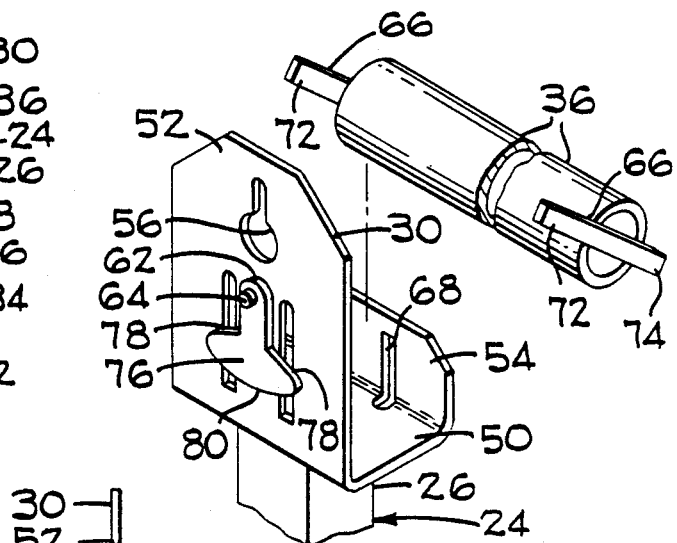
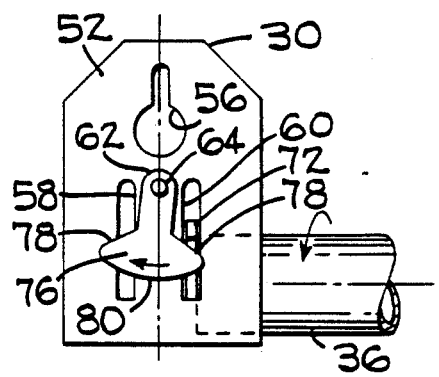
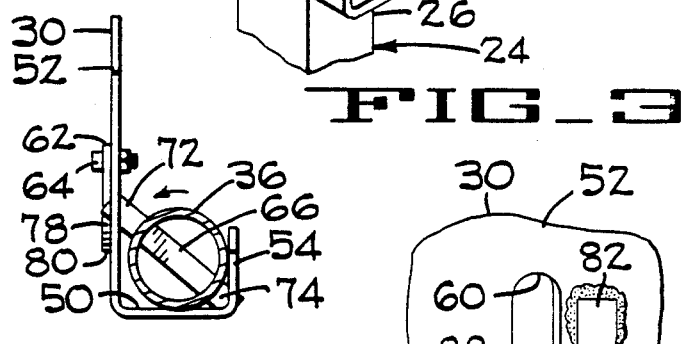
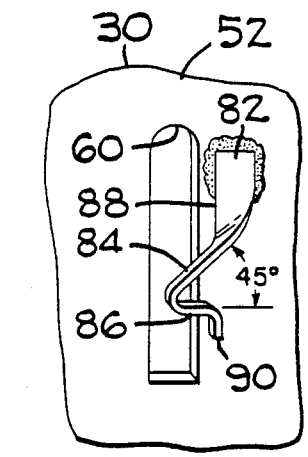
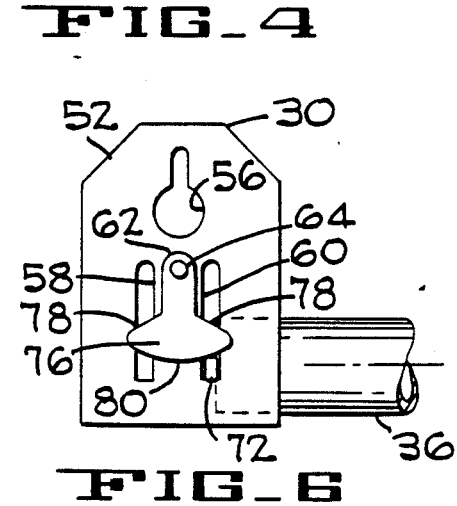
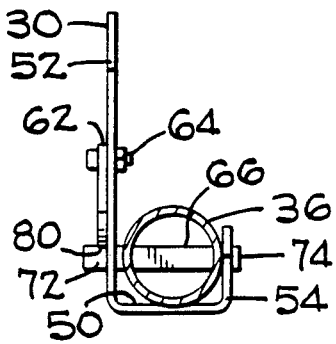

APPARATUS AND A METHOD FOR CONNECTING BELT CONVEYOR STRINGERS TO SUPPORT STANDS

This invention relates to bulk material belt conveyors, in particular to troughing belt conveyors, which are easily transported to a source of bulk material, and are then rapidly assembled and readily serviced at the bulk material site.

Troughing belt conveyors usually have an upper load carrying run, where the belt assumes a trough configuration, and a lower no load return run, where the belt assumes a generally horizontal shape. The conveyor starts at the source of the bulk material, which may be in a sand or gravel pit, or in a strip mine, or in the depths of a coal or mineral ore mine, or in a bulk material storage area such as a salt, sand or gravel pile, and runs to some designated area or location where the transported bulk material is collected. This type of conveyor is usually extendable or retractable in length, for the purpose of moving the receiving end of the conveyor to other bulk material sources on the site, and is readily and rapidly dismantled starting at any point in the conveyor run.

One known method and apparatus for erecting, servicing and dismantling troughing belt conveyors in the field has been by locking opposing ends of lengths of bars, beams or pipes, termed "stringers", to generally U-shaped brackets fixed to the tops of ground engaging support stands or posts. After the opposing ends of the stringers have been butt end mounted in the brackets, wedge or cloven pins were then driven into slots or aligned apertures in the assembly, by suitable impact tools, locking the stringer ends in the brackets. In order to disassemble the conveyor, or to remove any of the stringers from their brackets, it was necessary to disengage the wedge or cloven pins by the impact tool, or by some pin extraction tool.

According to the invention, the troughing belt conveyor comprises a catenary structure having a series of ground engaging columns or posts cross connected, in pairs, forming a framework of support stands, and each support stand framework is longitudinally locked to an adjacent support stand framework by laterally spaced parallel stringers made from lengths of round pipe, butt end mounted in slotted U-shaped brackets fixed to the tops of the columns or posts forming a structural framework supporting longitudinally spaced clusters of upper belt run idler rollers and longitudinally spaced lower belt run idler rollers.

The upper belt load run idler rollers are angularly disposed, in a cluster, with respect to each other and are mounted for rotation on bowed resilient shafts and support and form the trough configuration of the upper load carrying run of the conveyor belt. The opposite ends of the shafts are mounted to longitudinally spaced saddles or clamps fixed to the parallel stringers.

One lower belt return idler roller assembly is mounted horizontally to the bottom of each support stand and forms a part of that framework. The lower idler rollers support and carry the no-load return run of the conveyor belt.

One embodiment of an apparatus and method for connecting the opposite ends of a stringer to the U-shaped brackets on the tops of longitudinally spaced support stands, without the use of tools, comprises a gravity actuated cam keeper plate swingably mounted between two parallel vertical slots in an outer wall, which is the tallest of the two vertical parallel side walls of the U-shaped bracket. The opposite ends of the stringer have diametrically outwardly projecting lugs thereon, and the keeper plate has a depending cam body extending across the slots. The cam body is swingable to either side of either slot by one long lug, which projects radially outwardly from one side of the stringer, the long lug sliding downwardly in the appropriate slot to the bottom of that slot following the turning of the stringer about it's longitudinal axis. The cam body then swings back over the slots wedging the long lug between a curved bottom side of the cam body and the bottom of the appropriate slot, locking the lugged end of the stringer to the bracket.

The other vertical side wall of the bracket is the inner wall and is shorter in height than the tall outer wall to facilitate the insertion and removal of the opposing ends of the stringers between the vertical walls of each bracket. The short inner wall is provided with two parallel vertical slots that are laterally aligned with the two parallel vertical slots in the tall outer wall. These slots respectively receive the other projecting lugs, or short lugs, on the diametrically opposite sides of the opposing ends of adjacent stringers following the turning of the stringers and the locking of their long projecting lugs to the bottoms of the appropriate respective bottom ended slots in the outer walls under the upwardly curved bottoms of the cam keeper plates.

The diametrically projecting lugs fixed to the opposite ends of the stringer have long and short lug sides. The long lug sides on opposite ends of the stringer fit into the vertical slots of the outer walls of adjacent brackets, and the short lug sides fit into the vertical slots of the inner walls.

The parallel vertical slots in the outer wall of the bracket start at a closed top end at the upper half portion of the outer wall and terminate at a closed bottom end in the bottom half portion vertically spaced upwardly, from the flat horizontal bottom of the bracket, a distance sufficient to secure the long lug side in a horizontal position between the upwardly curved bottom of the depending cam portion of the keeper plate and the closed bottom of the long slot.

The parallel vertical slots in the inner vertical wall start at an open end in the flat horizontal bottom or base and extend upwardly through the adjacent corner and the inner wall, and terminate a vertical distance spaced upwardly from the base so that the short lug side is positioned horizontally in the closed upper end of the short slot and the long lug side is positioned horizontally and locked between the curved bottom of the cam portion of the keeper plate and the bottom closed end of the long slot.

Removal of any stringer from adjacent brackets only requires manually swinging and holding the cam portions of the keeper plates to one side of the slots wherein the long lug sides are locked under the cam portions thereby freeing the long lug sides and permitting the counter rotation of the stringer and reverse sliding of the long and short lug sides out of confinement in the respective slots in the outer and inner walls.

A second embodiment of the invention uses a pair of spring loaded cam keeper plates mounted to the sides of each long slot in the outer wall, for locking the long lugs in the bottom ends of the long slots, without the use of tools. Each keeper plate has an upper flat side portion fixed to the outer wall to one side of the long slot, and an intermediate cam portion which is formed by twisting the intermediate portion 90° with respect to the upper flat portion and is bent downwardly at approximately 45° extending into the downward path of the long lug side, when the stringer is rotated about its longitudinal axis, and is bent rearwardly at approximately 45° extending horizontally under the cam angled intermediate portion forming a bottom locking portion for locking the long lug side to the bottom closed end of the slot. A vertically depending stop is formed at the free end of the keeper plate to prevent reverse flexing of the free end toward the long lug side locked under the bottom locking portion. In order to remove the locked stringer ends from the adjacent slotted brackets, the intermediate cam portions are manually flexed towards the one sides of the slots and held there during the counter rotation of the stringer and reverse sliding of the lugs out of the slots in the outer and inner walls.

The outer wall above the top closed ends of the parallel slots is provided with a keyhole for hanging the support stand from a ceiling, or roof, by chains.

Both embodiments of the invention permit slight articulation of the locking lugs locked in the bottoms of the slots in order to compensate for misalignment between the opposing ends of the stringers, which is desirable for the stringers to follow slight irregularities in the path of the conveyor over the ground.

The various figures of the drawing will now be explained, in which:

FIG. 1 is a side view of a portion of a troughing belt conveyor with one embodiment of the stringer supporting and retaining bracket mounted to the tops of the ground engaging support stands;

FIG. 2 is a cross-section of the conveyor taken on lines 2—2 of FIG. 1;

FIG. 3 is a perspective view, with parts broken away, of the bracket and the opposite ends of the stringer with cross-bars affixed thereto, forming diametrically projecting long and short locking lug sides;

FIGS. 4–7 illustrate the twist-locking steps of locking the projecting lugs of one cross-bar in the closed ends of the adjacent slots in the inner and outer bracket walls under the cam portion of the depending keeper plate; and FIG. 8, illustrates the second embodiment of the lug keeper plate which is a spring loaded cam bar fixed to the outer wall of the bracket adjacent each slot and extending in the path of the long lug side when sliding downwardly in the slot.

With reference to FIGS. 1 and 2, the troughing belt conveyor 20 comprises a catenary structure or framework 22 having a series of ground engaging support stands 24 having lateral and longitudinal spaced upright support posts or columns 26. The lateral spaced posts 26 are fixed together in pairs by a cross-beam 28 extending across the bottom portion of the lateral spaced posts 26. A U-shaped stringer retaining and supporting bracket 30 is fixed to the upper end of each post 26, and a ground engaging shoe or slide 32 is fixed to a bar 34 slidably mounted in the bottom end of each post 26 for adjusting the height of the bracket 30. The formed framework of support stands 24 are connected together by dual sets of longitudinally extending round pipes or stringers 36, 36A and 36B butt end mounted in the support brackets 30. As shown in FIGS. 3, 5 and 7 elongated bars 66 are fixed to the opposite ends of the stringer 36, which have diametrically projecting long and short locking lugs 72, 74.

Two or more upper roller assemblies 38, which form the trough configuration of the load carrying run 40 of the belt conveyor, are spaced lengthwise along the stringers 36, 36A and 36B and are suspended therefrom by hook end portions which are seated in saddles or mounts 42 fastened to the parallel stringers. A lower idler roller assembly 44, which supports the return run 48 of the conveyor belt, extends across the bottom portions of the posts 26 and form a part of the support stand framework 24. The ends of the roller assembly 44 are mounted to roller carrier brackets 46 fixed to each upright post 26 of the framework 24.

With reference to FIGS. 3–7, the stringer retaining and supporting bracket 30 may be made from a piece of a U-shaped channel, or it may be formed from a steel plate. The flat bottom base portion 50 is flanked by parallel upright walls or sides 52, 54 which are of uneven heights. The upper end portion of the longer outer side 52 is provided with a keyhole 56 which is used to hang the belt supporting framework 22 from the ceiling, or roof, by chains (not shown). The lower end portion of the outer side 52 is provided with two identical spaced apart vertical slots 58, 60. Two complimentary spaced apart shorter vertical slots 68 (only one shown) are provided in the shorter inner side 54, which extend downwardly through the corner or junction of the inner side 54 and the base portion 50. The long slots 58, 60 in the outer wall 52 and the short slots 68 (only one shown) in the inner wall 54 form two laterally aligned and longitudinally spaced pairs of slots, i.e. one pair for each stringer locking bar 66 mounted on opposing ends of two adjacent stringers 36. The short slots 68 receive the shorter ends 74 of the locking bars 66, and the long slots 58, 60 receive the longer ends 72 of the locking bars 66.

Between the top closed ends of the long slots 58, 60 a gravity actuated cam keeper plate 62 is pivotally mounted to the outer side 52 of the bracket 30 by a bearing bolt and nut assembly 64. The lower end of the keeper plate 62 is provided with a pendulum-like cam portion 76 having symmetrical outwardly and downwardly flaring upper cam surfaces 78 and a curved bottom cam surface 80 merging into rounded ends with the opposite ends of the upper cam surfaces 78.

As shown in FIGS. 4 and 5, the locking lugged end of the stringer 36 is placed over the short side 54 of the bracket, onto the bottom 50, and then is rotated counterclockwise in the direction shown by the arrow in FIGS. 4 and 5. The longer lug end 72 of the locking bar 66 slides into the long slot 60 and contacts the downwardly flaring upper cam surface 78 of the swingable keeper plate and the shorter end 74 slides upwardly into the short slot 68 at opening in the corner of the base 50. Continued torquing of the stringer results in the longer lug end 72 of the locking bar 66 moving the keeper plate 76 leftwardly in the direction of the arrow shown in FIG. 4. Opening the passage of the long lug end 72 of the bar 66 to the closed bottom of long slot 60. Once the long end 72 of the bar 66 is seated in the bottom closed end of the long slot 60, the keeper plate 76 swings back, as shown in FIGS. 6 and 7, and the curved cam bottom 80 then wedges the long lug end 72 of the bar 66 against the closed bottom of the slot 60 and locks the short lug end 74 of the bar 66 against the top closed end of the short slot 68, thus locking the opposite ends of the stringer 36 to the longitudinally spaced bracket 30-30. The locking bar end of the next adjacent stringer, 36A or 36B, is then placed over the inner side 54 of the bracket 30 onto the bottom 50, and the above steps are repeated for locking the opposing end of the adjacent stringer 36A or 36B in the adjacent pair of long and short slots 58, 60, 68. All that is necessary to remove any one of the stringers 36, 36A or 36B from the longitudinally spaced support brackets 30-30, is to swing the pendulum keeper cam plates 76 to one side, thereby opening the long slots 60, 58 and freeing the long lug ends 72 of the bars 66 as the stringer 36, 36A or 36B is rotated in the opposite direction. The locking lug ends 72, 74 located in the pairs of slots 60, 68 and 58, 68, prevent axial moVement of the stringers 36, 36A and 36B, but do allow some angular movement relative to the brackets to follow irregularities in the path of the conveyor over the ground.

An alternate embodiment of a keeper plate is shown in FIG. 8. The alternate keeper plate is shaped from a rectangular flat bar into a spring loaded cam keeper plate 88 which is twisted 90° about its longitudinal body centerline. A to flat anchor portion 82 is formed for fixing, as by welding, to the long outer side 52 of the bracket 30, to one side of each of the long vertical slots 60 and 58. Below the anchor portion a downwardly and longitudinally extending cam portion 84 of approximately 45° is formed by twisting and bending the rectangular plate so that the outer facing flat side of the plate faces toward the top of the long vertical slot. The cam portion terminates a distance substantially less than the width of the slot and then is bent back at 45° into a horizontally extending keeper portion 86 which is positioned a vertical distance above the bottom of the long vertical slot sufficient to lock the long end 72 of the stringer locking bar 66 therebetween. The keeper portion terminates to the one side of the slot into a downwardly extending hook-like end 90 which prevents reverse flexing of the keeper portion 84 out of engagement with the long lug seated in the closed bottom of the slot.

When the stringer 36 is placed over the short side 54 of the bracket onto the bottom 50 and is then rotated thereby sliding the long locking lug end 72 of the bar 66 downwardly into the long vertical slot 60, the long lug side 72 flexes the cam portion 84 to the one side of the slot, opening the passage of the lug downwardly into the closed bottom end of the slot. The cam portion 84 then springs back locking the locking bar end 72 under the horizontal keeper portion 86. To remove the stringer 36 from adjacent brackets, it is necessary to flex the spring cam keeper plates 88 to the one sides of the slots and then turn the stringer in the opposite direction and slide the long lug sides upwardly toward and out of the upper closed end of the slots and slide the short lug sides downwardly through the openings in the bottom of the bases.

What is claimed is:

1. A belt conveyor stringer locking apparatus for connecting opposite ends of a longitudinally extending belt conveyor stringer to longitudinally spaced brackets respectively fixed to support stands, wherein the stringer has a cylindrical body and the brackets have two vertical slots, the stringer locking apparatus comprising:

a locking lug fixed to an end of the stringer and projecting radially outwardly therefrom, each bracket having a vertical wall facing parallel to the stringer with said two vertical slots being longitudinally spaced apart and having closed top and bottom ends therein, a locking lug keeper plate pivotally mounted to the wall midway between the two slots adjacent the closed top ends thereof and having a depending cam portion with symmetrical sides symmetrically covering intermediate portions of the two slots, the keeper plate swingable to one vertical side of either one of the two slots by engagement of one symmetrical side of the cam portion with a lug on each stringer end positioned in the inner most slots of two adjacent brackets upon rotation of the stringer in a direction for sliding the lugs to the closed bottom ends of the inner most slots, the keeper plate swingable by gravity back to the midway position between the two slots in each bracket following seating of the lugs in the closed bottom ends of the inner most slots locking the lugs in the inner most slots under the cam portion of each keeper plate.

2. The belt conveyor stringer locking apparatus according to claim 1, wherein the bracket comprises outer and inner parallel vertical walls, and wherein the first mentioned vertical wall is the outer wall and is laterally spaced from the inner wall by a horizontal flat base, the outer wall extending upwardly higher than the inner wall, the two vertical slots in the outer wall starting downwardly above the cam portion and ending below the cam portion, the closed bottom ends of the outer wall slots vertically spaced above the flat base a distance sufficient to receive and seat the lugs in the closed bottom ends of the slots in a horizontal projecting position under the cam portion.

3. The belt conveyor stringer locking apparatus according to claim 2, wherein a second locking lug is fixed to each end of the one stringer diametrically opposite to the first mentioned lug, the second lugs projecting radially outwardly from respective ends of the one stringer, and wherein the inner wall of each bracket of the two longitudinally spaced brackets is provided with two closed top and open bottom ended vertical slots laterally aligned with the two vertical slots in the outer wall for receiving the second lugs of the one stringer in the inner most slots in the inner walls of the two longitudinally spaced brackets, the two inner wall slots each starting with an opening through a corner of the flat base and ending in a closed upper end at an upper portion of the inner wall, the closed upper ends vertically spaced above the flat base a distance sufficient to receive and seat the second lugs in the upper closed ends of the inner wall slots in a horizontal projecting position.

4. The belt conveyor stringer locking apparatus according to claim 3, wherein the depending cam portion comprises two symmetrical downwardly and longitudinally outwardly flaring upper cam sides merging into a curved convex shaped bottom cam side, the symmetrical cam sides swingable to one vertical side of a respective outer wall slot by engagement of the respective upper cam side with the first mentioned lug, the curved cam bottom side wedging the lug against the closed bottom end of the respective outer wall slot.

5. A belt conveyor stringer lug locking apparatus for locking opposite lugged ends of an elongated cylindrical stringer between longitudinally spaced brackets, the apparatus comprising:

a bracket for supporting the lugged opposite ends of the stringer, the bracket having an upright outer wall with two longitudinally spaced apart vertically extending slots therein for receiving lugs on the lugged opposite ends of the stringer in the inner most slots of the spaced brackets, a spring loaded lug keeper plate having an upper end fixed to the outer wall to one vertical side of one respective slot and having a depending cam portion sloping downwardly and flaring longitudinally outwardly toward the other vertical side of the respective slot, and having a horizontal portion extending longitudinally inwardly from the bottom of the sloping cam portion past the one vertical side, the horizontal portion longitudinally moveable past the one vertical side by the engagement of the sloping cam portion with the lug upon rotation of the stringer in a direction for sliding the lug into a seating engagement with the bottom of the respective slot, the sloping cam portion springable back for locking the lug under the horizontal portion of the keeper plate following passage of the lug past the bottom of the sloping cam portion.

6. An apparatus for connecting a belt conveyor stringer to longitudinally spaced support stands, wherein the stringer is made from a length of round pipe and has locking lugs projecting diametrically outwardly from opposite ends of the pipe, comprising:
- a bracket fixed to each support stand for supporting opposite ends of the stringer, the bracket having a vertical outer wall with two parallel closed top and bottom ended vertical slots therein,
- means for locking one lug in one respective slot of one bracket carried on the outer wall and having a depending cam portion projecting downwardly and longitudinally toward one side of each closed ended slot, the cam portion moveable away from its respective slot by downward movement of the one locking lug in the respective slot engaging the respective cam portion, the respective cam portion returning in an opposite direction closing the respective slot to upward sliding of the one locking lug when seated in the bottom closed end of the respective slot thereby locking the one lug on the end of the stringer in the respective slot in the one bracket.

7. The apparatus for connecting the lugged ends of the belt conveyor stringer to the respective slotted brackets according to claim 6, wherein the depending cam portion is swingably mounted to the outer wall midway between the two slots, the cam portion further having a symmetrical downwardly and longitudinally outwardly extending upper cam body and an upwardly curved bottom cam body, the one lug engaging a respective upper cam body portion and swinging the respective cam portion to one side of the respective slot, and the respective cam portion swinging back and covering the respective slot concommitantly with the curved bottom cam body engaging the one lug and wedging the one lug in the closed bottom of the respective slot.

8. The apparatus for connecting the lugged ends of the belt conveyor stringer to the respective slotted brackets according to claim 6, wherein the depending cam portion is spring loaded and resiliently mounted to the outer wall to one side of each slot, the cam portion having a downwardly and longitudinally outwardly sloping cam body extending from the one side of the respective slot toward the other side, the sloping cam body merging at an apex with an intersecting lug locking portion extending horizontally to the one side of the respective slot and terminating into a vertically depending stop bar, the one locking lug when in the respective slot engaging the respective cam body and flexing the apex with the lug locking portion to the one side of the respective slot, the apex with the lub locking portion flexing back and locking the one locking lug in the closed bottom of the respective slot, and the stop bar engaging a side of the one locking lug limiting flexing of the apex with lug locking portion in the longitudinal direction toward the other side of the respective slot.

9. A method for connecting a belt conveyor stringer to longitudinally spaced support stands, wherein the stringer is made from a length of round pipe and has locking lugs projecting diametrically outwardly from opposite ends of the pipes, and wherein U-shaped brackets are fixed to the support stands, and the upright outer and inner walls of the U-shaped brackets are provided with longitudinally spaced vertical slots, the method for connecting the opposite lugged ends of the stringer between two longitudinally spaced U-shaped brackets comprising the steps of:
- rotating the stringer in the brackets and slidably engaging the lugs in the inner most slots between two longitudinally spaced brackets,
- moving a cam keeper plate mounted to the outer wall of each bracket to one side of the inner most slots by sliding the lugs across a sloping cam portion of each cam keeper plate,
- sliding the lugs downwardly in the opened inner most slots past the moved cam keeper plate and seating the lugs in closed ends of the inner most slots, the cam keeper plate automatically moving back and closing the inner most slots and locking the lugs under the cam keeper plate in the closed ends of the inner most slots.

* * * * *